March 17, 1964    A. M. PUTETTI    3,124,876
METHOD OF FORMING CUPPED ARTICLES
Filed Dec. 19, 1958    4 Sheets-Sheet 1
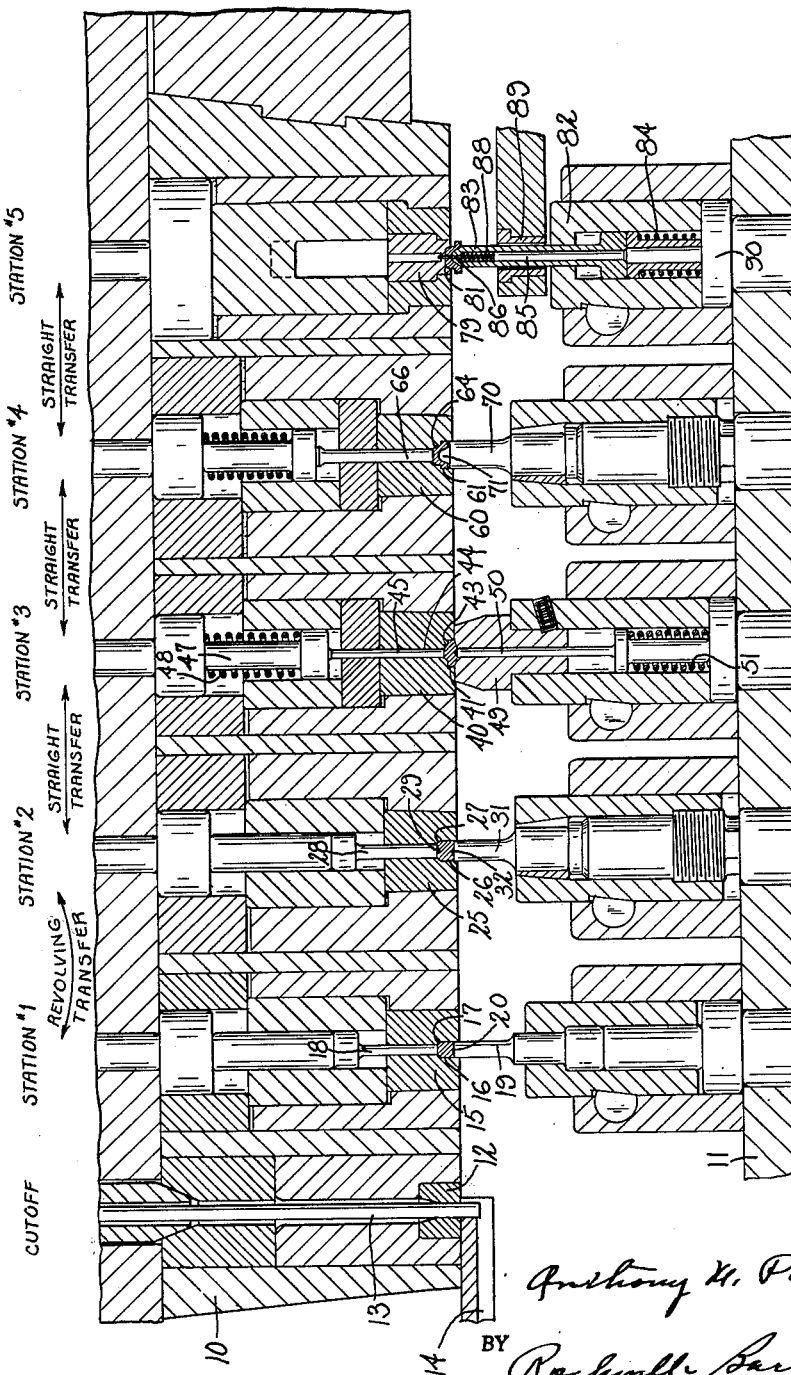

March 17, 1964  A. M. PUTETTI  3,124,876
METHOD OF FORMING CUPPED ARTICLES
Filed Dec. 19, 1958  4 Sheets-Sheet 2
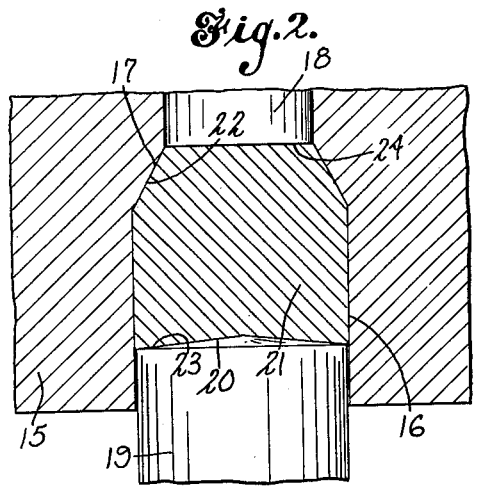
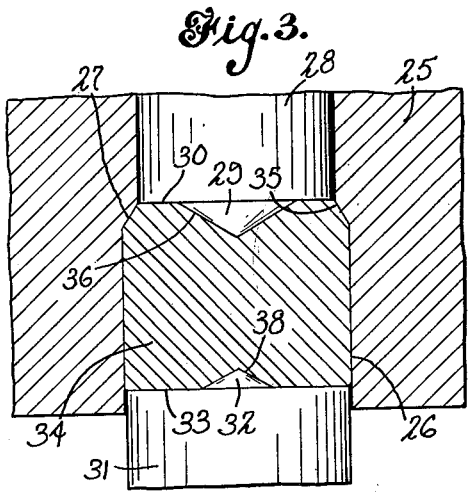
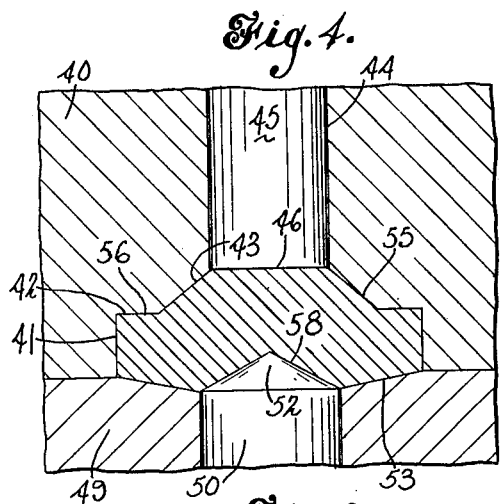
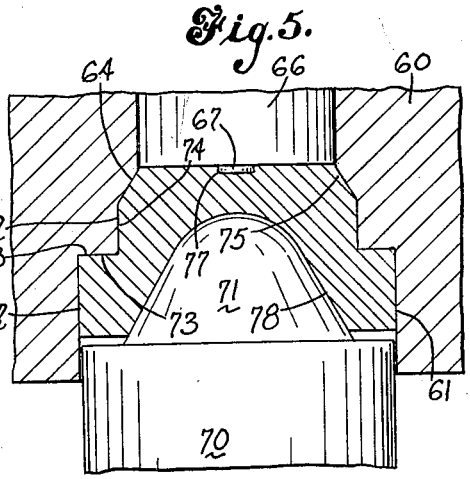
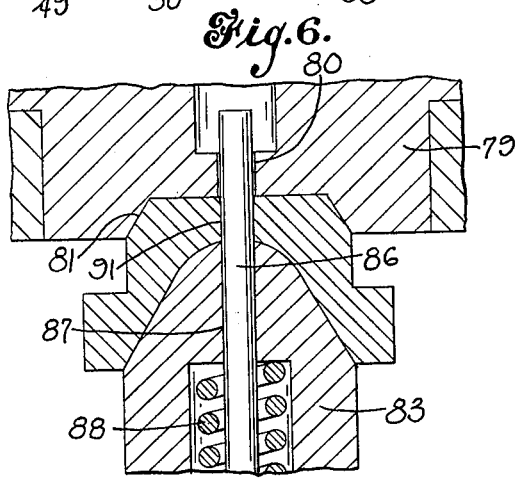
INVENTOR
Anthony M. Putetti
BY
ATTORNEYS INVENTOR
Anthony M. Putetti
BY Rockwell Bertholm
ATTORNEYS March 17, 1964   A. M. PUTETTI   3,124,876
METHOD OF FORMING CUPPED ARTICLES
Filed Dec. 19, 1958   4 Sheets-Sheet 4

INVENTOR
Anthony H. Putetti
BY
ATTORNEYS

United States Patent Office 3,124,876
Patented Mar. 17, 1964

3,124,876
METHOD OF FORMING CUPPED ARTICLES
Anthony Michael Putetti, Waterbury, Conn., assignor to Textron Inc., Providence, R.I., a corporation of Rhode Island
Filed Dec. 19, 1958, Ser. No. 781,672
3 Claims. (Cl. 29—534)

This invention relates to the method of making cupped articles and more particularly to a cupped metal article having a flange thereon such as may be used for push rod seats, for example, In the past articles of this character have been made by a stamping process from relatively heavy sheet meal. Such a method, however, entails a considerable loss of material due to the scrap which is left when the product is stamped from the metal sheet. It is contemplated by the present invention to produce such an article from rod or wire stock, a workpiece after having been cut from the stock being processed in a forming machine such, for example, as may be used for making nuts. Such a machine is usually provided with a plurality of dies held in a fixed die bed and a reciprocable gate carrying a plurality of punches is employed, each of the punches cooperating with one of the dies to form the finished product.

Such a product as is contemplated by the present invention requires a very high degree of accuracy and the dimensions must be held to very close tolerance so that they may be checked with gauges and conform to very precise dimensions. For this reason a method must be devised which will employ a blank of substantially the exact amount of metal required in the finished piece and form the latter from this blank without loss of material.

It is also necessary in products of this kind that the finished pieces have no flash of any kind which in their use may drop off as slivers of material. If such flash is present after the forming of the material, it must be removed in some manner, and it is, therefore, much more economical to form the product without any flash that must be removed.

One object of the present invention is to provide a new and improved method for making a flanged cup-shaped article such as a push rod seat from a blank cut from rod or stock material.

A further object of the invention is to provide a method of forming a push rod seat or like product from a blank cut from rod or stock material in which there will be little or no loss of material and in which the finished product will be precisely of the required dimensions and made to close tolerances.

A still further object of the invention is to provide a method of the character described wherein the finished product will be produced and delivered from the machine employed to perform the process without the presence of any flash.

To these and other ends the invention consists in the novel features and combinations of parts to be hereinafter described and claimed.

In the accompanying drawings:

FIG. 1 is a sectional view showing an apparatus for carrying out my improved process;

FIG. 2 is a sectional view of the tools employed at the first station in the apparatus;

FIGS. 3, 4, 5 and 6 are views similar to FIG. 2, showing the tools employed and the operations performed at the second, third, fourth and fifth stations;

Figure 11:
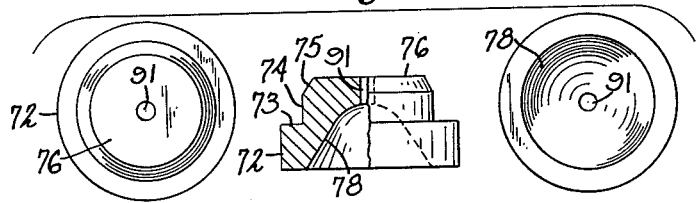
Figure 12:
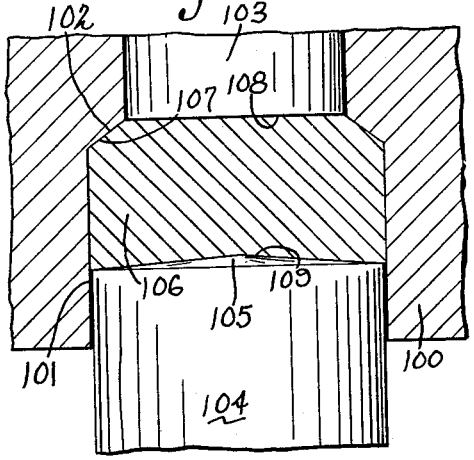
Figure 13:
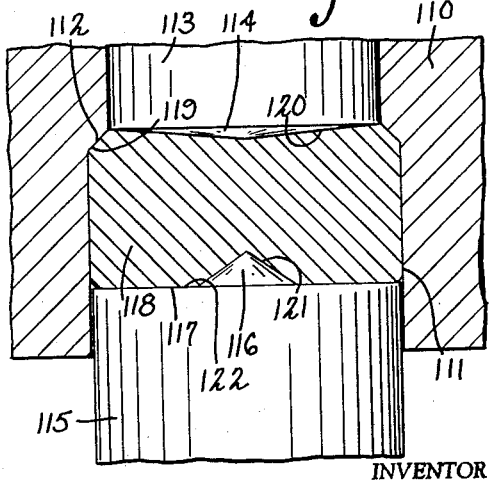
Figure 14:
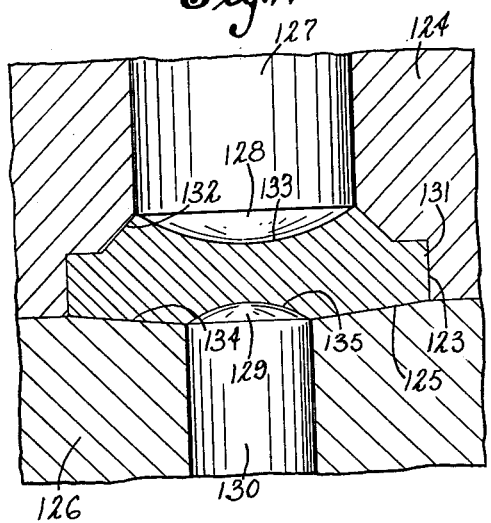
Figure 15:
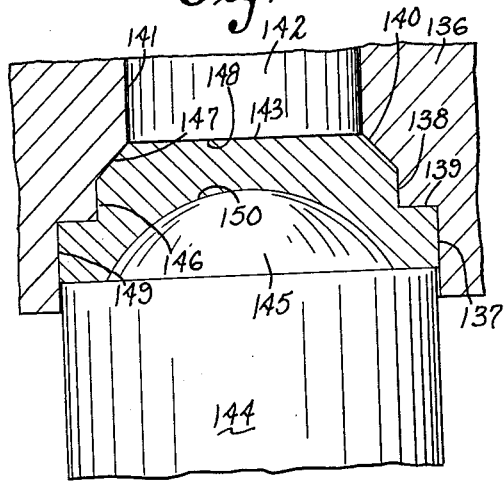
Figure 16:
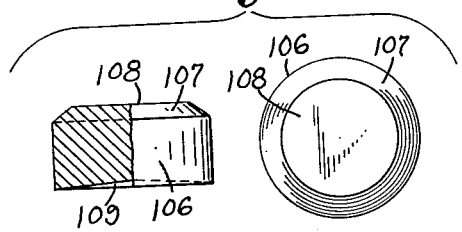
Figure 17:
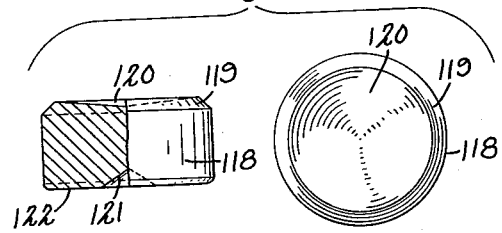
Figure 18:
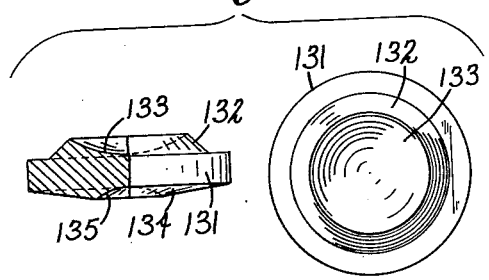
Figure 19:
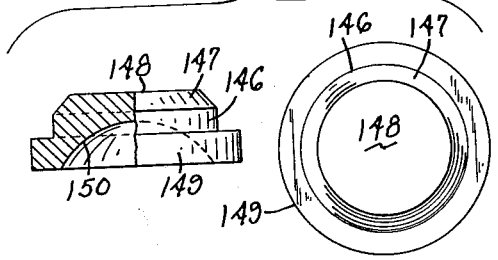

FIG. 11 comprises a top plan view, a side elevational view partly in section, and a bottom plan view of the finished product;

FIGS. 12, 13, 14 and 15 are sectional views showing the tools employed and the operations performed at the first, second, third and fourth stations in making a similar product by a slightly modified process;

FIG. 16 is a side elevational view, partly in section, and a top plan view of the workpiece after the operation performed thereon by the tools shown in FIG. 12; and FIGS. 17, 18 and 19 are similar views of the product after performing of the operations shown respectively in FIGS. 13, 14 and 15.

To illustrate a preferred embodiment of my invention, I have shown an apparatus such as a nut former or "parts former," for example, comprising a die bed 10 having a plurality of die stations at each of which a forming die is located as will be explained more particularly hereinafter. Cooperating with the die bed is a reciprocable gate 11 adapted for movement toward and from the die bed, the gate carrying a plurality of punches, one to cooperate with each of the dies. In the die bed is carried a cut-off die 12 having an opening therein through which a length of rod or wire stock 13 may be fed in a step-by-step manner by the usual means. When a length of stock protrudes from the cut-off die 12, it may be severed by the severing member or knife 14 in the usual manner and by this knife transferred to the first forming station of the machine. As previously stated the amount of metal in the workpiece cut from the length of stock will be substantially precisely that require for the finished product.

At the first forming station of the machine a die 15 is provided having a die opening 16 of cylindrical shape for the greater part of its length but tapering inwardly in conical form adjacent its inner end, as shown at 17. A knockout punch 18 is provided to close the inner end of the die opening and apply pressure to the workpiece during the forming operation.

Figure 7:
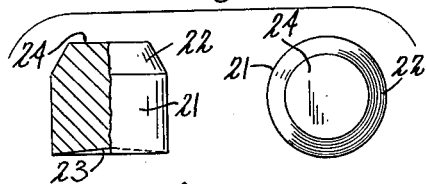
FIG. 7 represents a side elevational view partly in section and a top plan view of the blank after the first operation is performed thereon.

At this station the gate is provided with a punch 19 which, as shown more especially in FIG. 2, has a slightly conical inner end 20 to assist in centering the punch in the work. When a workpiece has been cut by the severing member 14 and transferred to a position opposite the die opening 16 and the gate advances toward the die, the workpiece will be pushed into the die and, by the application of pressure to both ends thereof, will be formed, as shown in FIGS. 2 and 7. As is shown, the workpiece will be of cylindrical form for the greater part of its length as at 21, and its inner end will be tapered or of conical shape, as shown at 22. The outer or punch face may be provided with a slight indent 23, while the die face of the blank is substantially flat, as shown at 24.

After the operation at station No. 1, the gate is withdrawn and the knock-out punch 18 advanced, all by means well known in the art, and the workpiece ejected from the die and received by transfer mechanism which transfers it to the second station of the apparatus. It is preferred to use such a transfer mechanism as will rotate the blank or turn it end for end in its transfer from the first to the second station. Such transfer mechanisms are also well known and need no description herein. By rotation of the blank during its transfer, the tapered or die end at 22 becomes the outer or punch end of the blank at the second station.

At this station the die bed is provided with a die 25 having a die opening 26 which also is of cylindrical form for the greater part of its length but provided with an inwardly tapering shoulder 27 adjacent its inner end. The die opening 26 is of slightly greater cross-sectional area than the die opening 16 at station No. 1 and is closed at its rear end by a knock-out pin 28 of considerably greater cross-sectional area than the pin 18. The pin 28 may be provided with a conical indenting tip 29 which, as shown in FIG. 3, is spaced from the peripheral edge of the pin so as to leave an annular flat surface 30 about the base of the tip 29. The gate at this station is provided with a punch 31 of a size to fit fairly snugly within the die opening 26, the face of the punch being provided with a small conical indenting tip 32 of such a size as to leave an annular flat surface 33 on the face of the punch about the tip.

Figure 8:
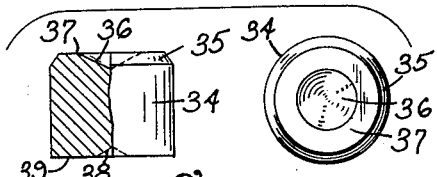
FIGS. 8, 9 and 10 are similar views of the blank after being processed at the second, third and fourth stations.

The form of the workpiece after the operation at station No. 2 is shown in FIG. 8 where, as illustrated, at 34, it is of cylindrical form for the greater part of its length and provided with a tapering frusto-conical surface 35 at its inner end. The inner or die face is indented, as shown at 36, leaving an annular flat surface 37 between the periphery of the indentation and the tapered area 35. At its other face the workpiece is slightly indented by the punch, as shown at 38, and provided around this indentation with a flat surface 39.

After the operation at station No. 2, the workpiece is ejected from the die by advance of the pin 28 and transferred to the third station of the machine. This transfer is preferably effected without rotation of the workpiece.

At this station the die bed is provided with a die 40 (FIGS. 1 and 4) having a die opening therein which at its outer end is enlarged, as shown at 41. Within this enlarged portion is a flat annular shoulder 42 joining the portion 41 at a sharp angle, and within the shoulder 42 is a tapered portion 43 terminating in a cylindrical opening 44 which is filled by a knock-out pin 45 having a flat end face 46. This knock-out pin, as will be seen, is considerably smaller than the pin 28 shown in FIG. 3.

The pin 45 is actuated by a rod 47 which is urged outwardly or toward the face of the die block by a compression spring 48 so that normally, when there is no blank in the die opening, the pin 45 projects from this opening to engage and guide the workpiece thereinto. The gate at this station is provided with a nosetype punch 49 having slidably mounted therein the pin 50, the latter being urged outwardly by the compression spring 51.

When the blank is transferred to station No. 3 without rotation, the pin 45 engages the recessed end 36 of the blank while the pin 50 engages the indentation 38 and holds the blank in position, when released by the transfer fingers, to enable the punch 49 to force the blank into the die opening, the pin 45 receding against the pressure of the spring 48. It may also be noted that, as shown in FIG. 4, the pin 50 is provided with a concial tip 52 while the punch 49 is provided with a shallow frusto-conical indentation 53.

Figure 9:
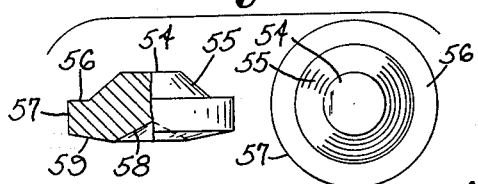

After the operation at the third station, the blank is in the form shown in FIG. 9. The central transverse section of the blank in FIG. 9 is conformed of a body portion having a flat face 56 from which a frusto-conical portion 54—55 extends. The diameter of the body portion is increased as indicated at 57 over the final diameter of the workpiece formed at the previous station, and that face portion of the body opposite the face 56 is inclined and indented at 59 and 58, respectively. The blank or workpiece is now in the proper form to be delivered to the fourth station for forming into its final shape, and it may be noted that the material above the surface 56 is no more than the material required above the shoulder in the completed product. The reason for this is that as the punch at the next station extends into the material beyond this shoulder, if there were excess material, it would be extruded and give a poor quality to the surface of the shoulder on the finished part.

The blank after being ejected from station No. 3, is transferred without rotation to station No. 4 where the die bed is provided with a die 60 having a die opening of the form shown more especially in FIG. 5 which comprises an outer cylindrical part 61, an intermediate cylindrical portion 62 separated from the outer part by a shoulder 63, and an inner tapered portion 64 providing a chamber on the finished cup. At its rear end the die opening is closed by a knock-out punch 66 actuated in a manner similar to the knock-out punch 45 of station No. 4. The punch 66 may be provided at its lower end with a small projecting tip or button 67 to aid in piercing an opening through this part of the blank at a following station.

To cooperate with the die 60 the gate is provided with a punch 70 having a tip or nose portion 71 to enter the workpiece and form a deep opening or indentation therein so that the resulting product will be of cup-shaped form. The opening 61 of the die is of considerable depth so that the punch 70 may enter the die and be properly guided in its movement. The nose 71 of the punch is guided by the indentation 58 formed at the die face of the blank at the third station.

Figure 10:
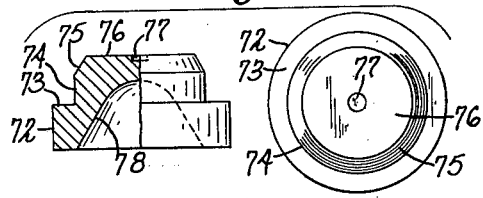

After the operation at the fourth station, the blank is of the form shown in FIG. 10 where it is provided with an outer cylindrical flange 72 separated by a shoulder 73 from an intermediate cylindrical portion 74 beyond which is the chamfered or tapered portion 75 and a flat end face 76 with a small indentation 77 therein. The other face of the blank is deeply indented, as shown at 78, this indentation extending considerably beyond the surface of shoulder 73.

The blank, after being processed at station No. 4, is transferred without turning to station No. 5, where an opening is pierced through the metal of the blank between the bottom of the opening 78 and the surface 76. At this station the die bed is provided with a piercing die 79 having an opening 80 therein only slightly larger than the hole being pierced so that it will support the back of the workpiece in such a manner as to give a clean break, leaving no burs. The die is also provided with a tapered socket 81 to receive and support the tapered surface 75 of the blank, as shown in FIG. 6.

At this station the gate is provided with a punch holder 82 for the piercing punch. In the holder 82 is slidably mounted a punch shell 83 urged outwardly by a spring 84. Within the punch shell is snugly but slidably received the body 85 of the piercing punch 86 which is adapted to project outwardly through an opening 87 in the shell 83. This piercing punch is normally held in a retracted position within the shell by a spring 88 so that, when the gate is withdrawn from the die, the end of the punch is completely within the shell. A stripper 89 is provided to strip the blank from the punch when the gate is withdrawn after the piercing operation.

When the blank, as shown in FIG. 10, is transferred to station No. 5 and the gate advances, the nose of the punch shell 83 is received within the opening or cavity 78 in the blank and centers the blank in the cavity in the die so as to give a perfect line-up for the punch in the die. The shell 83 holds the blank in contact with the die and, by completely filling the cup-shaped cavity, supports the blank, thereby preventing any further deformation of the blank during the piercing operation. As the forward movement of the gate continues, the punch sleeve collapses against the spring 84 until it bottoms against the plug 90. The piercing punch is then protracted beyond the shell and, because of its close guiding fit in the opening 87 of the shell 83, it is held directly on center and pierces the opening through the inner face of the blank.

As the gate recedes and brings the blank with it, the latter is stripped by the stripper 89 and the punch shell 83 is pushed forward so as to completely embrace the piercing punch 86 as previously explained, the spring 88 holding the punch in a retracted position within the shell, the body portion 85 of the latter bottoming at all times on the plug 90.

After this operation the completed product is shown in FIG. 11. Its dimensions and configuration are the same as those shown in FIG. 10, the only difference being that an opening 91 has been provided through the die end of the blank. Due to the accurate guiding of the punch and due to the fact that the opening 80 in the die 79 is very close to the size of the pin 86, the opening is cleanly formed and accurate in size and no burs remain.

In FIGS. 12 to 15 of the drawing a somewhat modified process is shown to make a push rod seat or other cup-shaped part. In this modified process, however, only four working stations are involved as the finished product is not pierced and, therefore, the fifth or piercing station may be omitted.

The tools at the first working station in this process are shown in FIG. 12, this being the first working station to which the workpiece is conveyed after being cut from the length of stock. Here a die 100 is provided with an opening 101 having an inner tapered portion 102. A knock-out pin 103 closes the inner end of the opening and the gate of the machine is provided with a punch 104 having a coned tip 105 to slightly indent the blank. When the gate is advanced, the punch 104 enters the die opening 101, as shown in FIG. 12, and the resulting shape of the workpiece is shown in FIG. 16 where, as illustrated, it is provided with a cylindrical body portion 106 having a tapered or chamfered inner portion 107 and a flat inner face 108. The outer face is slightly indented, as shown at 109.

The blank is then transferred and turned end for end or rotated during such transfer and delivered to the second station, the tools for which are illustrated in FIG. 13. Here a die 110 is provided with an opening 111 to receive the blank, this opening being provided with a relatively small chamfer 112. The die opening is closed by the knock-out pin 113 which is provided with a cone tip 114. The gate is provided with a punch 115 having a small central tip 116 of conical form surrounded by a flat surface 117.

Upon advance of the gate, the blank delivered from the first station is formed between the knock-out pin 113 and the punch 115, as shown in FIG. 17. It is provided with a cylindrical body portion 118, an inner chamfer 119 and an indentation 120 at its inner face. The outer face is also centrally indented, as shown at 121, to form a guide for the tools at the following station, this indentation being surrounded by a substantially flat surface 122.

The blank is then transferred without rotation to the third station in the device where are provided the tools shown in FIG. 14. These tools are of similar form to those already described and illustrated in FIG. 4, particularly so far as concerns the opening 123 in the die 124 and also the depression 125 in the nosetype punch 126. However, the knock-out rod 127 in the die is provided with a domed end portion 128 to form a dome-shaped depression in the work while a similarly shaped portion 129 is provided on the punch pin 130 slidably mounted with respect to the punch 126 and urged outwardly by a spring similar to the spring 51.

After the operation at this station, the blank is in the form shown in FIG. 18 where it is provided with a cylindrical flange 131 and an outwardly extending tapered portion 132 having a domed indentation 133 therein at the die face. At the punch face the blank is provided with a tapered surface 134 also having a domed indent 135 therein.

The blank is now transferred to the next station wherein are provided the tools shown in FIG. 15. Here the die 136 is provided with an opening, the outer portion of which is cylindrical as shown at 137. This portion joins an inner smaller cylindrical portion 138 by a square shoulder 139 and from the portion 138 inwardly the die is tapered, as shown at 140, to the opening 141 which is closed by the knock-out pin 142 provided with a substantially flat end face 143.

The punch 144 is provided with a domed tip 145.

After the operation at this fourth or last station, the blank is of the form shown in FIG. 19 where it is provided with a cylindrical body portion 146, a tapered inner portion 147 terminating in a flat face 148, and an outer flange 149. A deep dome-shaped indentation 150 is provided in the blank which extends beyond the inner edge of the flange 149 into the cylindrical portion 146.

Here again the amount of metal cut from the stock is precisely gauged so that exactly the amount of metal required for the finished blank will be contained in the workpiece and the operations are such that the finished article is made to precise dimensions without burs or flash which must be removed or which might be cast off during use.

While I have shown and described some preferred methods of carrying out my improved process, it is understood that it is not to be limited to all of the steps shown but is capable of modification and variation within the spirit of the invention and within the scope of the appended claims.

What I claim is:

1. The method of forming a cupped metal article with a central opening therethrough comprising cutting a workpiece from a length of solid bar stock, confining the workpiece in the opening in a suitable die and applying pressure to both faces thereof to form it into generally cylindrical shape with a tapered portion at the die end of the workpiece, turning the workpiece end for end and confining it in another die opening in the same machine to enlarge its diameter, form a chamfer adjacent one end and indenting both faces of the workpiece, then guiding the workpiece into a third die opening by the indentation so made and there flattening the workpiece to further enlarge its diameter and form a shoulder thereon, and tapering the metal of the workpiece inwardly in both directions from said enlarged portion while indenting one face thereof, then driving a punch into said intended face to a point beyond said shoulder to deeply indent the punch face of the workpiece and form a cup-shaped article and piercing an opening through the wall of the workpiece at the bottom of said deep indentation.

2. The method of forming a cup-shaped metal article with a central opening therethrough comprising cutting a workpiece from a length of solid bar stock, forming said workpiece into a blank having a body portion whose diameter is greater than that of the workpiece and having faces on opposite ends thereof, one face being a flat face from which extends a frusto-conical portion, the other face having a central axial indent therein, then driving a punch into said indentation to cup the blank to a depth beyond the flat face on the opposite end of said blank while allowing the material in said frusto-conical portion to flow laterally and in the direction of movement of the punch into a portion of cylindrical shape and into a tapered end portion beyond said cylindrical portion, advancing a sleeve-like shell punch into the cup-shaped cavity in the blank to completely fill and support the cup-shaped portion of the blank, and then piercing an opening through the closed end of the cup while the unpierced portion of the cup is being supported, the depth of the opening through the closed end of the cup being greater than its diameter.

3. The method of forming a cupped metal article with a small central opening therethrough comprising cutting a workpiece from a length of solid bar stock, confining the workpiece in the opening in a suitable die and applying pressure to both faces thereof to form it into generally cylindrical shape with a tapered portion at the die end of the workpiece, turning the workpiece end for end and confining it in another die opening in the same machine to enlarge its diameter, form a chamfer adjacent one end and indenting both faces of the workpiece, then guiding the workpiece into a third die opening by the indentation so made and there flattening the workpiece to further enlarge its diameter and form a shoulder thereon, and tapering the metal of the workpiece inwardly in both directions from said enlarged portion while indenting one face thereof, and then driving a punch into said indented face to a point beyond said shoulder to deeply indent the punch face of the workpiece and form a cup-shaped article with an indentation on the outer wall of the die face of the cupped article, supporting the cupped article in a suitable die having an opening to register with that to be formed in the workpiece, advancing a sleevelike shell punch into the cup-shaped cavity in the article to hold it against the die, and advaning a piercing punch through the hollow sleevelike punch to pierce an opening through the article while the sleevelike punch supports the unpierced portion of the article.

References Cited in the file of this patent

UNITED STATES PATENTS

| | | | |
|---|---|---|---|
| 2,170,473 | Fitch | Aug. 22, | 1939 |
| 2,287,214 | Wilcox | June 23, | 1942 |
| 2,542,023 | Friedman | Feb. 20, | 1951 |
| 2,559,140 | Wilcox | July 3, | 1951 |
| 2,689,359 | Friedman | Sept. 21, | 1954 |
| 2,736,085 | Parre et al. | Feb. 28, | 1956 |
| 2,751,676 | Kaul | June 26, | 1956 |
| 2,756,444 | Schaeffer | July 31, | 1956 |
| 2,874,460 | Riethmuller et al. | Feb. 24, | 1959 |

UNITED STATES PATENT OFFICE
CERTIFICATE OF CORRECTION

Patent No. 3,124,876                                    March 17, 1964

Anthony Michael Putetti

It is hereby certified that error appears in the above numbered patent requiring correction and that the said Letters Patent should read as corrected below.

Column 1, line 14, for "meal" read -- metal --; column 2, line 38, for "require" read -- required --; column 4, line 13, for "chamber" read -- chamfer --; column 8, line 2, for "advaning" read -- advancing --.

Signed and sealed this 21st day of July 1964.

(SEAL)

Attest:

ESTON G. JOHNSON                                       EDWARD J. BRENNER
Attesting Officer                                           Commissioner of Patents